(12) United States Patent
Dong et al.

(10) Patent No.: US 9,898,273 B1
(45) Date of Patent: Feb. 20, 2018

(54) DYNAMICALLY UPDATING APIS BASED ON UPDATED CONFIGURATION FILE OF A COMPUTING SYSTEM

(71) Applicant: VCE Company, LLC, Richardson, TX (US)

(72) Inventors: Wei Dong, Plano, TX (US); Arthur O. Beall, III, Sachse, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 100 days.

(21) Appl. No.: 14/978,050

(22) Filed: Dec. 22, 2015

(51) Int. Cl.
  *G06F 9/44*       (2006.01)
  *G06F 9/445*      (2018.01)
  *H04L 29/08*      (2006.01)

(52) U.S. Cl.
  CPC ............... *G06F 8/65* (2013.01); *H04L 67/34* (2013.01)

(58) Field of Classification Search
  CPC ......................................................... G06F 8/65
  USPC ................................................. 717/168–178
  See application file for complete search history.

(56) References Cited

U.S. PATENT DOCUMENTS

| | | | | |
|---|---|---|---|---|
| 5,546,573 A | * | 8/1996 | Obermann | ........ G06F 17/30575 |
| 7,765,525 B1 | * | 7/2010 | Davidson | ............ G06F 11/3624 717/110 |
| 8,984,101 B1 | * | 3/2015 | Viswanath | .......... H04L 67/1008 709/220 |
| 2003/0208579 A1 | * | 11/2003 | Brady, Jr. | ................. G06F 8/65 709/223 |
| 2003/0217126 A1 | * | 11/2003 | Polcha | ................ G06F 9/44505 709/220 |

OTHER PUBLICATIONS

Sproull, Todd S., John W. Lockwood, and David E. Taylor. "Control and configuration software for a reconfigurable networking hardware platform." Field-Programmable Custom Computing Machines, 2002. Proceedings. 10th Annual IEEE Symposium on. IEEE, 2002. pp. 1-10.*

(Continued)

*Primary Examiner* — Satish Rampuria
(74) *Attorney, Agent, or Firm* — Polsinelli PC

(57) ABSTRACT

Aspects of the present disclosure involve systems and methods for providing extensibility of one or more APIs of a computing system management interface to allow a user of the management interface to dynamically generate new interfaces for data attributes from one or more underlying hardware components of the computing system. In one particular embodiment, a management interface is configured to receive a configuration file from a user of the system through a user interface. The configuration file may define or otherwise indicate a type of API utilized by the management interface to communicate with components of the computing system and receive information concerning those components. The configuration file may also cause the management interface to update the identified API according to the update. By dynamically updating the number and type of APIs utilized by the management interface, the user may obtain information concerning the components of the computing system otherwise not previously available.

18 Claims, 5 Drawing Sheets

(56) References Cited

OTHER PUBLICATIONS

Guccione, Steve, Delon Levi, and Prasanna Sundararajan. "JBits: A Java-based interface for reconfigurable computing." 2nd Annual Military and Aerospace Applications of Programmable Devices and Technologies Conference (MAPLD). vol. 261. 1999. pp. 1-9.*

Brightwell, Ron, et al. "Massively parallel computing using commodity components." Parallel Computing 26.2 (2000): pp. 243-266.*

* cited by examiner

US 9,898,273 B1

DYNAMICALLY UPDATING APIS BASED ON UPDATED CONFIGURATION FILE OF A COMPUTING SYSTEM

TECHNICAL FIELD

Aspects of the present disclosure relate to configuration of various computing components, among other functions, and more particularly to providing extensibility to one or more application program interface (API) to a user of a computing system to extract information concerning the computing system from diversified sources.

BACKGROUND

Widespread adoption of virtualization is rapidly revolutionizing the ways information technology ("IT") departments procure, implement, and operate technology. As such, converged infrastructures provide dynamic pools of computing resources that are intelligently provisioned and managed to address changing demands of customers. For example, a converged infrastructure may include pools of compute, storage, and network devices that may be shared and accessed by multiple applications. Integrating, validating, and managing such components is often a drain on IT resources. Accordingly, pre-configured, pre-integrated, and validated infrastructures are highly desirable to customers. Generally, such converged infrastructures include a management tool that allows administrators of the infrastructure to manage components and adapt and extend services to one or more users of the infrastructure. However, changes to the management tool often require a request from a user of the infrastructure for the change, updating to the underlying software of the management tool, and a dissemination of the updated software to the requesting user.

SUMMARY

Implementations of the present disclosure include a method for managing a computing system. The method includes receiving, at a management interface program of a computing system, a configuration file from a user computing device, the management interface program comprising a plurality of application program interfaces (APIs) for communicating with one or more hardware components of the computing system, updating at least one of the plurality of APIs based on the received configuration file, the updated API comprising at least an identification of an available dataset of operational information of at least one of the one or more hardware components of the computing system available based on the received configuration file, utilizing the updated API of the at least one of the plurality of APIs to request the available operational information from the at least one of the one or more hardware components of the computing system, and receiving the available operation information from the at least one of the one or more hardware components of the computing system. Other implementations of the present disclosure include one or more non-transitory tangible computer-readable storage media storing computer-executable instructions for performing a computer process on a computing system to perform one or more of the operations above.

DETAILED DESCRIPTION

Figure 1:
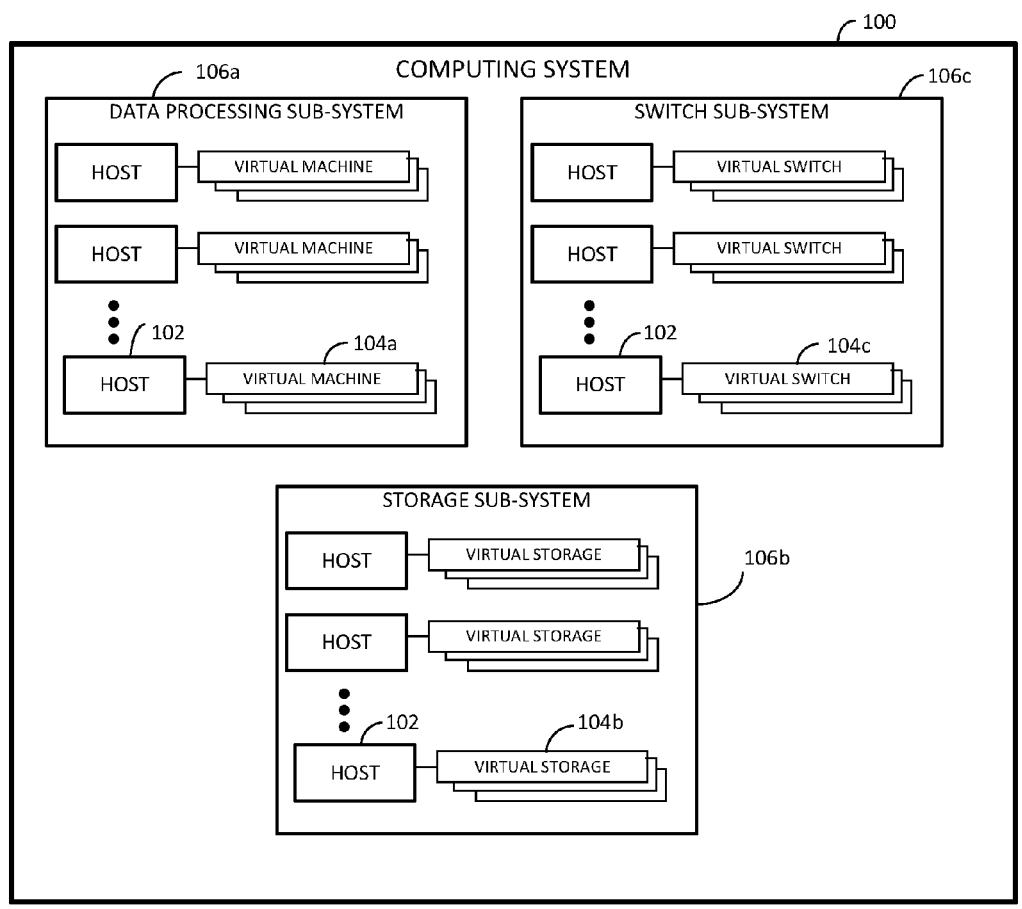
FIG. 1 illustrates an example computing system that may be implemented as a computing node of a distributed computing environment according to one embodiment of the present disclosure.

Aspects of the present disclosure involve a computing system, method, and/or computing program for providing extensibility of one or more APIs of a computing system management interface to allow a user of the management interface to dynamically generate new interfaces for data attributes from one or more underlying hardware components of the computing system. In general, the management interface for the computing system may allow a user of the interface to discover components or otherwise obtain information concerning components of the computing system. Obtaining information concerning the computing system may be accomplished through one or more APIs to the various hardware components of the system. However, the management interface may only request certain types of information from the components of the computing system to provide to users of the management interface. Extension of the type of information obtained by the management interface and/or the number of components to which the management interface communicates often takes a full software development lifecycle to develop, from contemplation through testing and release to users of the management interface. Thus, the present disclosure provides dynamic access to the one or more APIs of the management interface to provide flexibility in the type of information available through the interface to the user.

In one particular embodiment, the management interface is configured to receive a configuration file from a user of the system through a user interface. The user interface may be a computing system interface or a third party interface. The configuration file may define or otherwise indicate a type of API utilized by the management interface to communicate with components of the computing system and receive information concerning those components. Thus, in one embodiment, the update configuration file may include one or more new lines that modify or otherwise extend one or more APIs utilized by the management interface to communicate with the components of the system to obtain additional information about the components. By dynamically updating the APIs utilized by the management interface, the user may obtain information concerning the components of the computing system otherwise not previously available. Further, through the use of the updatable configuration file, a user of the management interface does not have to wait for the software development cycle typically needed for such a feature to obtain the information from the computing device. Rather, the desired information may be obtained once the management interface receives the updated configuration file such that the third party (or computing system) interface may be updated with the newly requested component information or data. In this manner, extensible access to APIs of a computing system management interface is provided to allow a user of the management interface to dynamically generate new interfaces for data attributes from one or more underlying hardware components of the computing system.

The various systems and methods disclosed herein provide for an extensible management interface for one or more components of a converged infrastructure. It will be appreciated that, although some of the example implementations described herein involve management of a converged infrastructure system, the system and methods described herein may apply to any type of computing system or computing network where programs or interfaces provides management services and features for one or more hardware components of the computer system.

As mentioned above, the computing system and/or method for providing an extensible interface for managing the computing system may be, in one embodiment, a converged infrastructure. Thus, FIG. 1 illustrates an example computing system 100 that may utilize the methods and systems described herein. In one embodiment, multiple computing systems 100 as described herein may be configured to communicate with one another using a communication network to form at least a portion of a distributed computing environment.

The computing system 100 may be any type having multiple hosts 102 that each executes one or more virtual objects (e.g., virtual machines 104a, virtual storage objects 104b, and virtual switch objects 104c). The hosts of a computing system are often referred to as compute servers. Nevertheless, in this disclosure, the term 'host' may be interpreted as any physical device and/or component that supports the operation of virtual resources and services provided by those virtual resources. The particular computing system 100 as shown includes several sub-systems, such as a data processing sub-system 106a, a data storage sub-system 106b, and a switch sub-system 106c. Nevertheless, it should be understood that computing system may include additional, fewer, or different types of sub-systems without departing from the spirit and scope of the present disclosure.

In one particular implementation, the computing system 100 may be a converged infrastructure system, an integrated computing system, or another computing system having hundreds of components, such as compute components (e.g., Cisco®, Intel®, or IBM® blade appliances), storage components (e.g., EMC® static and dynamic storage drives), network components (e.g., Cisco® switches/gateways/routers) or virtualization components (e.g., VMware® VMs) components. Many of these components do not inherently interact with each other such that proper configuration and testing of the system is time intensive. One example of such a computing system may be a VCE VBLOCK® System from VCE® Company, LLC, which is located in Richardson, Tex.

In one aspect, the converged infrastructure 100 includes a combination of sub-systems discussed above or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 100 such as that shown includes components found in Vblock™ System infrastructure packages available from VCE®, LLC, which is located in Richardson, Tex.

In one embodiment of the converged infrastructure, the data storage sub-system 106b includes computer-readable memory structures for storing data used by the converged infrastructure 100, which may include network attached storage (NAS) arrays and/or storage area network (SAN) arrays that are facilitated by multiple virtual objects (e.g., virtual storage objects 204b). The switch sub-system 106c provides for communication among the various sub-systems of the converged infrastructure 100, and may include components, such as fabric interconnect systems, Ethernet switches/routers, multilayer director switches (MDSs), and the like. The data processing sub-system 106a executes applications that access, store, and otherwise manipulate data stored by the converged infrastructure 100. For a particular example, either of the data storage sub-system 106b, the switch sub-system 106c, and/or the data processing sub-system 106a may comprise a blade computing platform having multiple hosts (e.g., blade computing devices) that each executes one or more virtual objects.

Each sub-system may include multiple hosts 102 that each executes one or more virtual objects, which in this particular example, are virtual machines (VMs) 104a, virtual storage objects 104b, and virtual switch objects 104c. For example, virtual objects, such as the VMs 104a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™® software suite that is available from VMware® corporation, which is located in Palo Alto, Calif.

In one embodiment of the converged infrastructure, a management tool or software may be made available to administrators and/or users of the converged infrastructure. Through the management tool, an administrator or user may access information concerning the computing system 100 and/or manage one or more components of the system. As described in more detail below, the management tool utilizes one or more APIs to communicate with the components of the computing system 100 to obtain performance, health, operation, and other information from the components. Such information may be provided to one or more user interfaces by the management tool for management of the system 100 by the users. One example of a suitable development tool includes the Vision software suite that is available from VCE®, LLC, which is located in Richardson, Tex.

Figure 2:
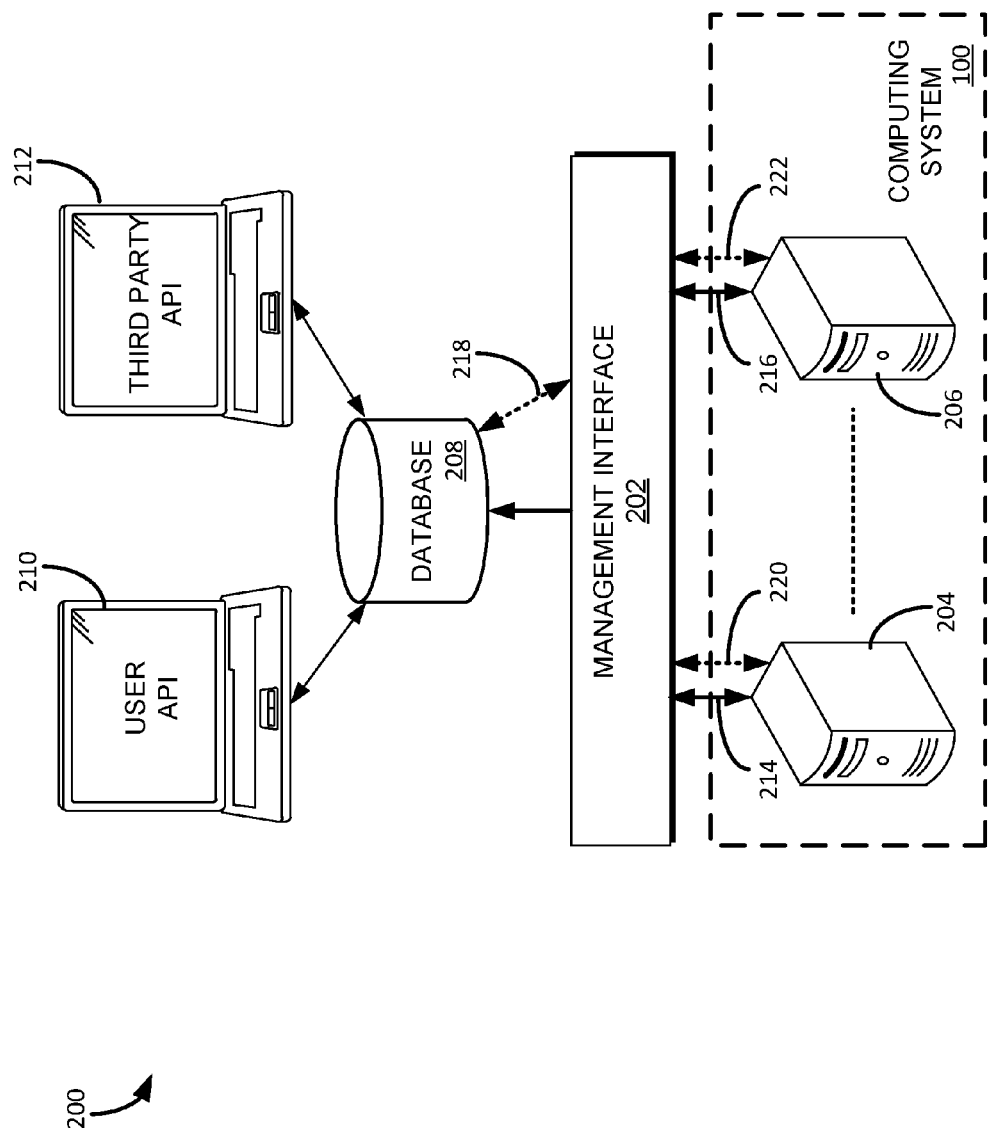
FIG. 2 illustrates an example computing system for providing an extensible API for a computing system management tool according to one embodiment of the present disclosure.

FIG. 2 illustrates an example computing system for providing an extensible API for a computing system management tool according to one embodiment of the present disclosure. In particular, the system 200 of FIG. 2 illustrates a management tool 202 in communication with a computing system 100. In one embodiment, the computing system 100 is the computing system of FIG. 1 and described above. As such, the computing system 100 may include several hardware components, illustrated as hardware components 204 and 206. Although only two such components are shown, it should be appreciated that the computing system 100 may include any number of hardware components located in any disparate location in communication over a network (as illustrated by the dashed line between the illustrated components of the computing system). Such hardware components 204-206 may be any type of computing device that may be queried through an API to determine some operating state or condition of the component, such as switches, data processing devices, storage devices, processing devices, network devices, and the like. In another example, the computing system 100 may be a computing device and the hardware components 204-206 may be hardware components of the device, such as processors, memory, buses, input/output (I/O) components, and the like. In general, the computing system 100 may be any system that includes computing components that is accessible through an API to obtain some information concerning the component.

The management interface 202 provides an interface to the components 204-206 of the computing system 100. In particular, the management interface 202 utilizes one or more APIs to communicate to the various hardware components of the system 100. For example, the management interface 202 may utilize a first API (illustrated as arrow 214 of FIG. 1) to communicate with component 204 of the system 100. For example, the first component 204 of the system 100 may communicate with other computing devices through a first computing language. Thus, to communicate with the first component 204, the management interface 202 utilizes a first API 214 that translates commands and other communications into the first computing language such that information may be transmitted to and received from the first component. Similarly, a second component 206 of the system 100 may communicate with other computing devices through a second computing language. To communicate with the second component 206, the management interface 202 may utilize a second API 216 different than the first API that translates commands and other communications into the second computing language such that information may be transmitted to and received from the second component.

In addition, other components may be added to the computing system 100 or existing components may be communicated with by the management interface 202. For example, several components of the system 100 may utilize the same language to communicate with other devices. Thus, the management interface 202 may utilize a particular API to communicate with more than one component of the system 100, if the components utilize the same language to communicate with other computing devices. In this manner, the management interface 202 may include or utilize any number of APIs to communicate with the components 204-206 of the system 100 based on the types of component and/or the languages utilized by the components to communicate.

Through the APIs 214-216, the management interface 202 obtains operational and/or other information concerning the hardware components 204-206 of the system. For example, the management interface 202 may obtain an operational state of the components, port assignment information for networking components, processing usage and capacity of compute components, alarms or failures detected by the components, traffic information for one or more ports associated with a component, and the like. Such information may be requested by the management interface 202 through the use of one or more APIs. In particular, the management interface 202 may intend or be instructed to obtain a particular computing system 100 information or data. The management interface 202 may, in response, generate one or more instructions, commands, or other type of requests to obtain the information. The request may be translated utilizing an API and be transmitted to the destination component. Upon receipt, the component 204-206 may receive the translated request and provide the requested information back to the management interface 202 through the associated API 214-216. In this manner, the information or data concerning the system 100 may be requested and received by the management interface 202 of the system 200.

Further, the management interface 202 may be configured to automatically or dynamically detect when new components are added or are activated within the computing system 100. In particular, as the components 204-206 of the system 100 are configured and reconfigured in response to a desired operation of the system, some components may be added or removed (taken off-line) from the system. In such an example, the management interface 202 may be configured to routinely or automatically query the computing system 100 to detect the operation status or one or more components 204-206 of the system. Then, when an operational state of a component is detected, the management interface 202 may obtain information concerning the components of the system 100. In this manner, the management interface 202 may automatically discover new components or a new configuration of the components of the system 100.

Once the system information and/or data are obtained, the management interface 202 may store any received data into the database 208 of the system 200. The database 208 may be updated by the management interface 202 as new information is obtained to maintain an up-to-date recording of the system 100 information. Further, the database 208 may be made available to one or more user interfaces 210-212 for management and monitoring of the computing system 100. For example, a user interface (labeled "User GUI" in FIG. 1) executed on a user computing device 210 may provide access the information stored in the database 208. In one particular embodiment, the user interface includes a graphical user interface (GUI) through which a user may interact to retrieve information about the computing system 100. The user GUI executed on the user computing device 210 may be provided by a party associated with the computing system 100 to allow the user to manage or monitor the computing system 100. For example, the user GUI on the user computing device 210 may allow the user to monitor the overall health of the computing system 100, determine the overall performance of the system (including the number of virtual machines, usage of one or more central processing units (CPUs), and/or determine the standard compliance of the system, among many other functions.

Similarly, the database 208 may be available to a third party computing device 212 and/or third party GUI to provide the information to a user of the third party GUI. In this example, the third party GUI 212 may be aware of the information available to the third party computing device stored the database 208. The third party GUI 212 may utilize this information in any manner to customize a user of the third party GUI's experience in monitoring the computing system 100. For example, a particular third party or customer of the computing device 100 may desire to obtain all port traffic information for the system, while ignoring other information, such as the compliance of the components of the system. Thus, the third party GUI 212 may be configured to obtain the port information and process and present this information in a manner desired by the third party customer or user. In this manner, the third party GUI 212 may be configured or created to obtain, process, and/or present the information available from the database 208 concerning the computing system 100.

As the number of hardware components 204-206 of the computing system 100 grows or changes, extracting information from such diversified sources by the management interface 202 may become time-consuming. For example, although many sources share similar communication mechanisms and schemes, such as simple network management protocol (SNMP), representational state transfer (REST), command-line interface (CLI), and the like, there is no one standard for the APIs 214-216 to adopt a uniform request-response format. Further, depending on the version of the management interface 202 utilized, the information obtained from the components 204-206 of the information system 100 may be organized differently or the presentation of the information may be changed from a previous version, making accessing such information difficult.

In addition, many third party GUIs 212 depend upon certain types of information being stored in the database 208 for use by the interfaces. However, at some later time, a developer of administrator of the third party GUI 212 may desire to obtain different information of the computing system 100 that is not already stored in the database 208. To instruct the management interface 202 to obtain this desired information, a request is typically sent to a developer of the management interface to update the software to obtain the desired information. A complete lifecycle of a new software revision may occur, followed by an update to one or more instances of the management interface 202 in the field or already sold. Once updated, the desired information may be made available to the third party GUI 212 in the database 208. However, such a procedure may take many weeks to perform, resulting in a high cost to the software developer and the third party.

To provide additional flexibility to the management interface 202 to adapt to requests from interfaces 210-212 for information, methods and systems are described herein to provide extensibility of one or more APIs of computing system management interface to allow a user of the management interface to dynamically generate new interfaces for data attributes from one or more underlying hardware components 204-206 of the computing system. By providing a programmable API interface, onsite definition of new data feeds for new or existing components 204-206 of the system 100 may be provided without time lag or an extra development effort.

Figure 3:
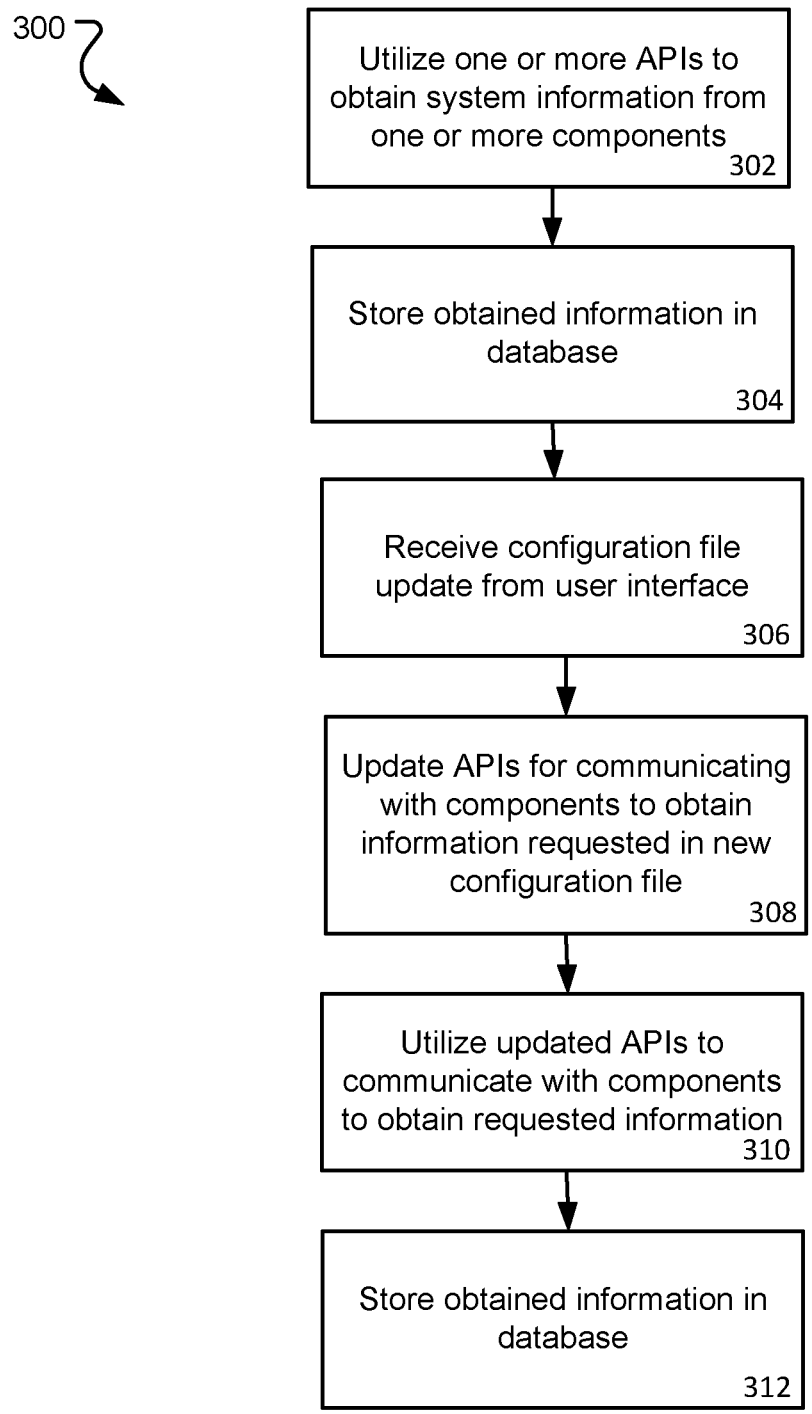
FIG. 3 is a flowchart of a method for a management interface program to receive a configuration file to dynamically extend one or more APIs in communication with a computing system.

FIG. 3 is a flowchart of a method for a management interface program to receive a configuration file to dynamically extend one or more APIs in communication with a computing system. In general, the operations of the method 300 of FIG. 3 are performed by the management interface 202 of the system 200 of FIG. 2. However, it should be appreciated that the operations may be performed by any number of components of the system 200 of FIG. 2 or computing devices or components not illustrated in the system. Further, the operations may be performed using a software program executed on a computing device, hardware components of the computing device, or a combination of both software and hardware of the device.

Beginning in operation 302 and using the system 200 of FIG. 2 as an example, the management interface 202 utilizes one or more APIs to communicate with one or more components 202-204 of the computing system 100, as described above. In particular, the management interface 202 utilizes one or more APIs 214-216 to communicate with the hardware components 204-206 of the computing system 100. In one embodiment, the management interface 202 may access the hardware components 204-206 automatically (such as during a discovery procedure of the interface to discover new or reconfigured components of the system 100). Accessing the hardware components 204-206 may include a request for operational information, state information, port information, or any other information that may be reported to the management interface from one or more components of the system 100.

As also described above, the management interface 202 may store the received information in the database 208 in operation 304. By storing the information in the database 208, the information is made available to one or more user interfaces, such as the user GUI 210 associated with the computing system 100 or a third party GUI 212 developed by a third party or customer of the system. In one embodiment, the information stored in the database 208 to allow a user of the interfaces 210-212 to monitor the health and performance of the computing system 100 through the user interfaces. However, as explained above, the user interfaces 210-212 are generally limited to the information the management interface 202 is configured to obtain from the components 204-206 of the system.

To provide extensibility of one or more APIs of a computing system management interface to allow a user of the management interface 202 to dynamically request new data attributes from one or more underlying hardware components 204-206 of the computing system 100, the management interface may receive a updated configuration file from one or more of the user interfaces 210-212 in operation 306. In one embodiment, the updated configuration file is received through the database 208. More particularly, a user of the user interface 210-212 uses the user interface to update a configuration file. The user interface 210-212 then uploads the updated configuration file to the database 208. Utilizing communication line 218 of FIG. 2, the management interface 202 obtains the updated configuration file from the database 208. In another embodiment, the updated configuration file is provided directly to the management interface 202 without being stored in the database 208. In general, the configuration file includes information and/or requests for particular computing system 100 information that are desired by the user interface 210-212. In other words, the configuration file defines an update to one or more APIs to retrieve data sets that a developer of the user interface 210-212 desires to obtain to process and/or otherwise display to a user of the interface. As such, the configuration file may identify any number of APIs and/or hardware components 204-206 of the system 100 from which certain data sets of information is desired and provide extensions to those APIs accordingly.

Once the configuration file is obtained, the management interface updates the APIs may be used to communicate with the hardware components 204-206 of the computing system 100 identified in the updated configuration file in operation 308. For example, the configuration file may request port information for every switch device of the computing system 100. Further, the computing system 100 may include two types of switch devices that utilize two different APIs to communicate with the management interface 202. Thus, the management interface 202 may determine that two APIs are used to communicate with the two types of switch devices of the computing system 100 and update those APIs with the new line of code within the updated configuration file. In some embodiments, the requested information is already obtained by the management interface 202 through existing APIs, but not stored in the database 208 as information requested by the user interfaces 210-212 to the system 100. In such an example, the updated configuration file may cause the management interface 202 to update the APIs currently used to communicate with the components 204-206 and request the information from the one or more hardware components. In still another embodiment, an updated API may be obtained from a storage device in communication with the management interface, such as through one or more connections to a network.

In operation 310, the management interface 202 communicates with the one or more hardware components 204-206 identified in the updated configuration file through the one or more updated APIs (illustrated in FIG. 2 by communication line 220-222). Through this communication, operational information of the components is requested by and provided to the management interface 202 based on the updated configuration file received through the one or more user interfaces 210-212. Further, in operation 312, the management interface 202 may store the obtained information in the database 208, through communication line 218. Once stored, the requested information or data sets are available to the one or more user interfaces 210-212 in communication with the database 208. Thus, through the operations of the method 300 of FIG. 3, extensibility of one or more APIs of a computing system management interface is provided to allow a user of the management interface 202 to dynamically request new data attributes from one or more underlying hardware components 204-206 of the computing system 100.

Figure 4:
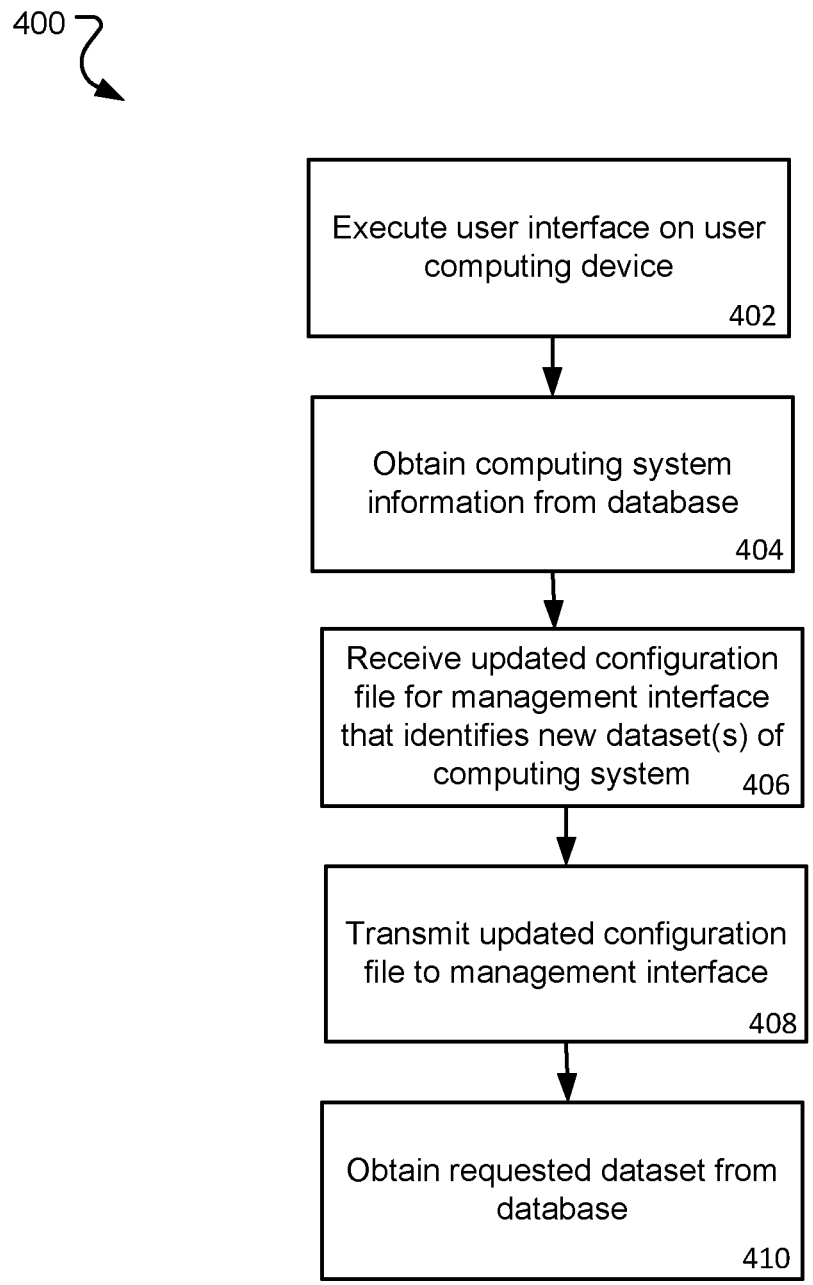
FIG. 4 is a flowchart of a method for a user interface to provide an updated configuration file to a management interface to request an additional dataset of a computing system.

FIG. 4 is a flowchart of a method for a user interface to provide an updated configuration file to a management interface to request an additional dataset of a computing system. In general, the operations of the method 400 of FIG. 4 are performed by a user interface (such as user GUI 210 or third party GUI 212) executed on a computing device. The operations may be performed using a software program executed on a computing device, hardware components of the computing device, or a combination of both software and hardware of the device.

Beginning in operation 402, a user interface is executed on a computing device. For example and utilizing the system 200 of FIG. 2, a user interface 210 may be executed on a computing device to provide access to and information from the computing system 100. The user interface 210 may be provided to the user from an administrator of the computing system 100. In another example, a third party may utilize a third party user interface 212 executed on a computing device. The third party user interface 212 may be created and managed by a third party user to provide access to and information from the computing system 100. Further, the third party user interface 212 may be customized to a particular user's needs to maintain and manage the computing system 100.

In operation 404, the user interface (regardless of which user interface 210-212 is used) accesses a database 208 in which information concerning the operation, state, compliance, or any other information about the computing system 100 is stored. As described above, information and data sets of the computing system 100 is obtained by a management interface 202 and stored in the database 208. This information is made available to one or more user interfaces 210-212 in communication with the database 208 such that the user interfaces may obtain the information and process it according to the user interface. In this manner, a third party user interface may obtain and process the computing system 100 information as desired.

In some instances, however, information desired by a creator or administrator of the third party user interface 212 may not be obtained by the management interface 202 and stored in the database 208. In other words, the management interface 202 may not be programmed or executed to obtain the computing system 100 information desired by the user interface. In one example, the management interface 202 may have access to the desired information, but may not be otherwise instructed or executed to obtain the information although communication with a particular hardware component 204 of the system 100 that reports the information may be established and other information from the component is obtained. In another example, the management interface 202 may not communicate with the particular hardware component 204 from which the information may be obtained as the management interface is currently configured.

To extend the information obtained by the management interface 202 in response to a request by a user of the user interface 210-212, the user interface may receive an updated configuration file for the management interface 202 in operation 406. In one embodiment, the update configuration file is provided to the user interface 210-212 from a user of the user interface. In general, the updated configuration file includes some identification of datasets, information, and/or hardware components 204-206 of the computing system 100 that the user of the user interface 212 desires to be obtained from the management interface 202 and stored in the database 208. In one particular embodiment, this identification may be an update to a particular API utilized by the management interface 202. This updated API causes the management interface 202 to communicate with one or more of the hardware components of the computing system 100 to obtain the requested information from the components.

In operation 408, the updated configuration file is transmitted to the management interface 202 of the system 200. In one embodiment, the updated configuration file is stored in the database 208 and accessed from the database by the management interface 202. In another embodiment, the updated configuration file is transmitted directly to the management interface 202 through a network connection between the computing device executing the user interface 210-212 and the management interface. Regardless of how the updated configuration file is transmitted, the management interface 202 receives the updated configuration file and executes the file as described above to obtain the requested information from the computing system 100 and store the requested information in the database 208. Thus, in operation 410, the user interface 210-212 updates one or more APIs of the interface and executes the APIs to obtain the requested dataset or information from the database once the information is stored. Further, the user interface 210-212 may then process the information based on the configuration of the user interface and display the processed information to a user of the user interface. In this manner, a user of the user interface 210-212 may provide an updated configuration file to extend one or more APIs of a computing system management interface to allow a user of the user interface to dynamically request new data attributes from one or more underlying hardware components 204-206 of the computing system 100.

Figure 5:
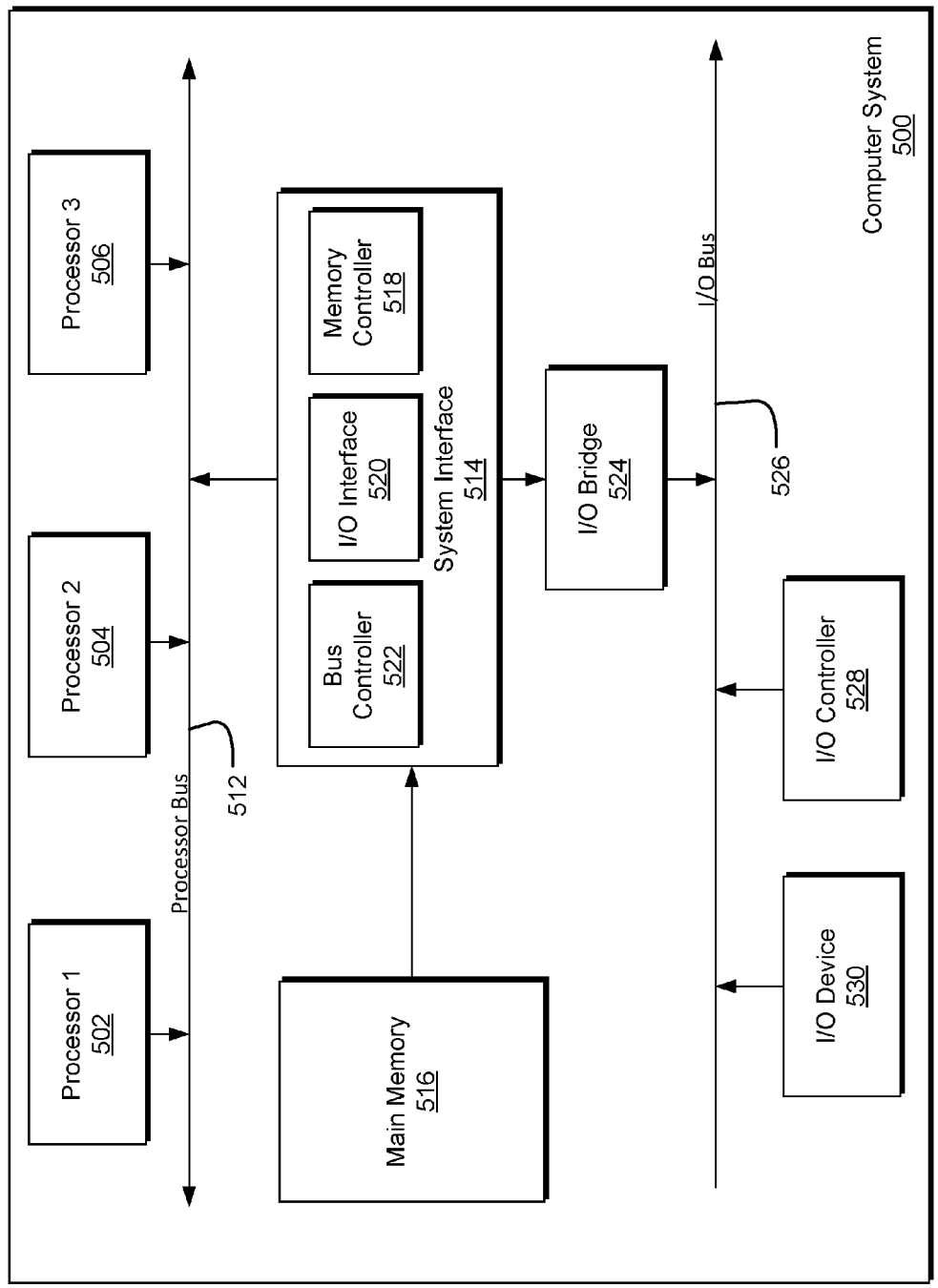
FIG. 5 shows an example computing system that may implement various systems and methods discussed herein, according to one implementation.

FIG. 5 is a block diagram illustrating an example of a computing device or computer system 500 which may be used in implementing the embodiments of the components of the computing environment 200 disclosed above. For example, the computing system 500 of FIG. 5 may be used to implement the various components of the system 200 discussed above, such as the user computing device or the management interface 202. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer, as described above with reference to FIG. 5.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for managing a computing system, the method comprising:
receiving, by a management interface program of a computing system, a configuration file, the management interface program comprising a plurality of application program interfaces (APIs) for communicating with and between one or more hardware components of the computing system;
dynamically updating at least one of the plurality of APIs based at least on the received configuration file, the updated API comprising at least an identification of a dataset of an available operational information of at least one of the one or more hardware components of the computing system available based on the received configuration file, wherein the available operational information includes at least one of an operational state of the components, port assignment information for networking components, processing usage and capacity of compute components, alarms or failures detected by the components, traffic information for one or more ports associated with a component;
utilizing, by the management interface program, the updated API of the at least one of the plurality of APIs to request the available operational information from the at least one of the one or more hardware components of the computing system;
receiving, by the management interface program, the available operational information from the at least one of the one or more hardware components of the computing system; and
interfacing, using the management interface program, with and between the one or more hardware components based at least in part on the available operational information, wherein the at least one of the one or more hardware components of the computing system comprises a compute device and the available operational information from the at least one of the one or more hardware components of the computing system comprises available processing capacity of the compute device.

2. The method of claim 1 further comprising:
storing the received available operational information from the at least one of the one or more hardware components of the computing system in a database, wherein the database is in communication with a user computing device for retrieval from the database by the user computing device.

3. The method of claim 2 wherein the user computing device stores the configuration file in the database prior to the management interface receiving the configuration file.

4. The method of claim 2 wherein the configuration file is received from the user computing device over a network connection.

5. The method of claim 2 wherein the user computing device executes a user interface and the configuration file from the user is received through the user interface.

6. The method of claim 1 wherein the computing system is a converged infrastructure computing system comprising a plurality of hardware component devices.

7. The method of claim 6 wherein the at least one of the one or more hardware components of the computing system comprises a storage device and the available operational information from the at least one of the one or more hardware components of the computing system comprises available storage capacity of the computing device.

8. The method of claim 1 further comprising:
utilizing, by the management interface program, the updated API of the at least one of the plurality of APIs to request additional available operational information from a second one of the one or more hardware components of the computing system.

9. One or more non-transitory tangible computer-readable storage media storing computer-executable instructions for performing a computer process on a computing device, the computer process comprising:
receiving, by a management interface program executed on the computing device, a configuration file, the management interface program comprising a plurality of application program interfaces (APIs) for communicating with and between one or more hardware components of a converged computing system;
dynamically updating at least one of the plurality of APIs based at least on the received configuration file, the updated API comprising at least an identification of a dataset of an available operational information of at least one of the one or more hardware components of the converged computing system available based on the received configuration file, wherein the available operational information includes at least one of an operational state of the components, port assignment information for networking components, processing usage and capacity of compute components, alarms or failures detected by the components, traffic information for one or more ports associated with a component;
utilizing, by the management interface program, the updated API of the at least one of the plurality of APIs to request the available operational information from the at least one of the one or more hardware components of the converged computing system;
receiving, by the management interface program, the available operational information from the at least one of the one or more hardware components of the converged computing system; and
interfacing, using the management interface program, with and between the one or more hardware components based at least in part on the available operational information, wherein the at least one of the one or more hardware components of the converged computing system comprises a compute device and the available operational information from the at least one of the one or more hardware components of the converged computing system comprises available processing capacity of the compute device.

10. The one or more non-transitory tangible computer-readable storage media of claim 9 wherein the computer process further comprises:
storing the received available operational information from the at least one of the one or more hardware components of the converged computing system in a database, wherein the database is in communication with a user computing device for retrieval from the database by the user computing device.

11. The one or more non-transitory tangible computer-readable storage media of claim 10 wherein the user computing device stores the configuration file in the database prior to the management interface receiving the configuration file.

12. The one or more non-transitory tangible computer-readable storage media of claim 10 wherein the user computing device executes a user interface and the configuration file from the user is received through the user interface.

13. The one or more non-transitory tangible computer-readable storage media of claim 9 wherein the at least one of the one or more hardware components of the converged computing system comprises a storage device and the available operational information from the at least one of the one or more hardware components of the converged computing system comprises available storage capacity of the compute device.

14. The one or more non-transitory tangible computer-readable storage media of claim 9 wherein the computer process further comprises:
utilizing, by the management interface program, the updated API of the at least one of the plurality of APIs to request additional available operational information from a second one of the one or more hardware components of the converged computing system.

15. A computer system comprising:
a plurality of hardware component devices; and
a management interface executed on a computing device and in communication with the plurality of hardware component devices, the management interface program comprising a plurality of application program interfaces (APIs) for communicating with and between one or more hardware components of the plurality of hardware components and executing a plurality of computer-executable instructions to perform a computer process comprising:
receiving a configuration file;
updating at least one of the plurality of APIs based at least on the received configuration file, the updated API comprising at least an identification of a dataset of an available operational information of at least one of the one or more hardware components of the computing system available based on the received configuration file, wherein the available operational information includes at least one of an operational state of the components, port assignment information for networking components, processing usage and capacity of compute components, alarms or failures detected by the components, traffic information for one or more ports associated with a component;

utilizing, by the management interface program, the updated API of the at least one of the plurality of APIs to request the available operational information from the at least one of the one or more hardware components of the computing system;

receiving, by the management interface program, the available operation information from the at least one of the one or more hardware components of the computing system; and interfacing, using the management interface program, with and between the one or more hardware components based at least in part on the available operational information, wherein the at least one of the one or more hardware components of the computing system comprises a compute device and the available operational information from the at least one of the one or more hardware components of the computing system comprises available processing capacity of the compute device.

16. The computer system of claim 15 wherein the computer process performed by the management interface program further comprises:

storing the received available operational information from the at least one of the one or more hardware components of the computing system in a database, wherein the database is in communication with a user computing device for retrieval from the database by the user computing device.

17. The computer system of claim 16 wherein the configuration file is received from the user computing device over a network connection.

18. The computer system of claim 15 wherein the user computing device executes a user interface and the configuration file from the user is received through the user interface.

* * * * *